US009731951B1

(12) United States Patent
Tolbert

(10) Patent No.: US 9,731,951 B1
(45) Date of Patent: Aug. 15, 2017

(54) DEVICE FOR THREADING A SEAT BELT THROUGH A CHILD'S CAR SEAT

(71) Applicant: Jeremy Trent Tolbert, Sulphur, LA (US)

(72) Inventor: Jeremy Trent Tolbert, Sulphur, LA (US)

( * ) Notice: Subject to any disclaimer, the term of this patent is extended or adjusted under 35 U.S.C. 154(b) by 0 days.

(21) Appl. No.: 14/530,683

(22) Filed: Oct. 31, 2014

Related U.S. Application Data

(60) Provisional application No. 61/898,453, filed on Oct. 31, 2013.

(51) Int. Cl.
*B60N 2/28* (2006.01)
*B66F 19/00* (2006.01)

(52) U.S. Cl.
CPC .................... *B66F 19/00* (2013.01)

(58) Field of Classification Search
CPC ........ B60N 2/26; B60N 2/265; B60N 2/2803; B60N 2/2806
See application file for complete search history.

(56) References Cited

U.S. PATENT DOCUMENTS

| 3,424,038 | A | * | 1/1969 | Smith | G01B 3/1071 24/171 |
| 5,197,176 | A | * | 3/1993 | Reese | B25B 33/00 29/270 |
| 5,496,083 | A | * | 3/1996 | Shouse, Jr. | B25B 9/00 29/278 |
| 5,620,231 | A | * | 4/1997 | Marker | B60N 2/265 29/278 |
| 5,954,397 | A | * | 9/1999 | Czernakowski | B60N 2/2806 297/250.1 |
| 6,508,510 | B2 | * | 1/2003 | Yamazaki | B60N 2/2806 297/250.1 |
| 6,779,842 | B2 | * | 8/2004 | McNeff | B60N 2/2806 297/250.1 |
| 7,029,068 | B2 | * | 4/2006 | Yoshida | B60N 2/2806 297/250.1 |
| 7,210,743 | B1 | * | 5/2007 | Dale | B60N 2/2806 297/463.2 |
| 9,085,447 | B1 | * | 7/2015 | Royall | B25J 1/04 |
| 2002/0092135 | A1 | * | 7/2002 | Mancini | B60N 2/2806 24/33 R |
| 2006/0163923 | A1 | * | 7/2006 | Baumann | B60N 2/2806 297/254 |
| 2008/0303325 | A1 | * | 12/2008 | Scholz | B60N 2/2806 297/250.1 |
| 2013/0104363 | A1 | * | 5/2013 | Allen | B60N 2/2806 29/428 |

\* cited by examiner

Primary Examiner — Philip Gabler
(74) Attorney, Agent, or Firm — Nick A. Nichols, Jr.

(57) ABSTRACT

A device for threading a seat belt through a child's car seat to secure the car seat on a vehicle seat may include a carriage assembly moveably supported in the device. The device may be installed in a channel extending across the child's car seat. A drive mechanism housed within the device may be coupled to the carriage assembly. Actuation of the drive mechanism moves the carriage assembly along the longitudinal length of the device the opposite ends of the channel. The latch end of the vehicle seat belt may be removably connected to the carriage assembly and the seat belt threaded through the channel to the opposite side of the child's car seat. The latch end of the seat belt may be disconnected from the carriage assembly and latched to the seat belt buckle.

10 Claims, 6 Drawing Sheets

DEVICE FOR THREADING A SEAT BELT THROUGH A CHILD'S CAR SEAT

BACKGROUND

The present invention relates generally to securing a child's car seat in a vehicle, and in particular to a device for threading a seatbelt through the back of a child's car seat.

Car seats for children are in common usage and are typically positioned on the rear seat of a vehicle. The vehicle's seat belts are used to firmly secure the child's car seat to the rear seat of the vehicle. Many child car seats are provided with an opening or channel for passage of a seat belt through the channel and connection to a seat belt buckle which is attached to a structural member of the vehicle. A three-point seat belt system is common in many vehicles. The three-point seat belt system includes a shoulder portion and a lap portion. A sliding latch on the seat belt permits adjustments of the shoulder and lap portions to accommodate the size of an occupant. To secure the child's car seat on the rear seat of a vehicle, the latch and shoulder and lap portions of the seat belt must be threaded through the seat belt channel in the child's car seat and the latch inserted into the vehicle seat belt buckle. Because of the flexibility of the seat belt and the relatively small size of the channel in the child car seat, it is often difficult for an adult sized hand and arm to squeeze into the channel a sufficient distance to thread the seat belt through the channel and connect the latch to the seat belt buckle.

SUMMARY

A device for threading a seat belt through a child's car seat to secure the car seat on a vehicle seat may include a carriage assembly moveably supported in the device. The device may be installed in a channel extending across the back side of the child's car seat. A drive mechanism housed within the device may be coupled to the carriage assembly. Actuation of the drive mechanism moves the carriage assembly along the longitudinal length of the device. The latch end of the vehicle seat belt may be removably connected to the carriage assembly and the seat belt threaded through the channel to the opposite side of the child's car seat. The latch end of the seat belt may be disconnected from the carriage assembly and latched to the seat belt buckle.

BRIEF DESCRIPTION OF THE DRAWINGS

So that the manner in which the above recited features, advantages and objects of the present invention are attained can be understood in detail, a more particular description of the invention briefly summarized above, may be had by reference to the embodiments thereof which are illustrated in the appended drawings.

It is noted, however, that the appended drawings illustrate only typical embodiments of this invention and are therefore not to be considered limiting of its scope, for the invention may admit to other equally effective embodiments.

DETAILED DESCRIPTION

Figures 1, 2, 3:
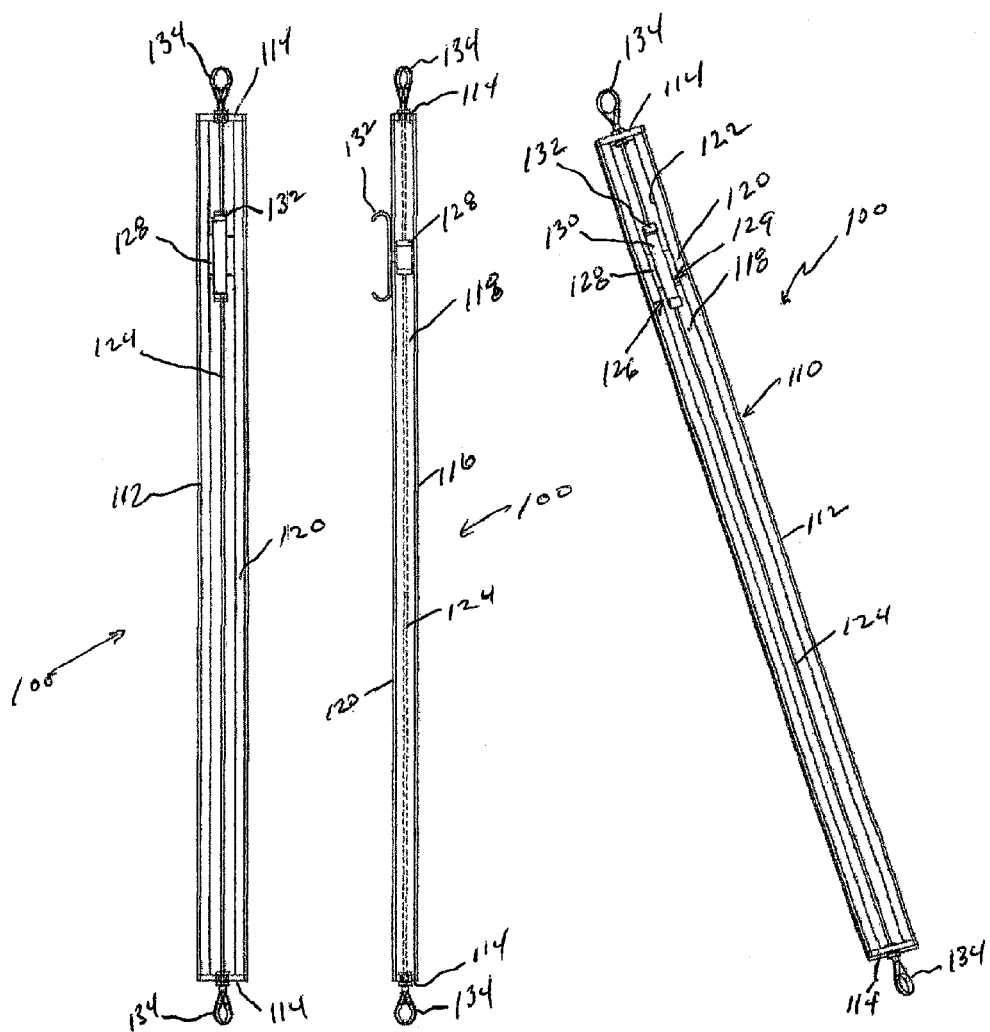
FIG. 1 is a perspective view of a device for threading a seat belt through a channel in the back of a child's car seat.
FIG. 2 is a side view of the threading device shown in FIG. 1.
FIG. 3 is a top plan view of the threading device shown in FIG. 1.

Referring first to FIG. 1, a device for threading a seat belt through an opening or a channel in a child's car seat is generally identified by the reference numeral 100. The device 100 may comprise an elongate body 110. The body 110 may be substantially rectangular having sidewalls 112, end walls 114 and a bottom wall 116 defining an interior chamber 118. The body 110 may include a top wall 120 fixed to the upper edges of the sidewalls 112 and end walls 114. The top wall 120 may be provided with a longitudinal slot 122 extending between the end walls 114.

Referring now to FIGS. 1-3, collectively, the device 100 may include a drive assembly housed within the chamber 118. The drive assembly may include a pair of elastic members 124 and a carriage assembly 126. The carriage assembly 126 may include a base 128 having a width dimension greater than the width dimension of the slot 122 in the top wall 120 of the device 100. The base 128 may have a box-like shape formed by six substantially flat sides and all angels between the flat sides are right angles. The base 128 may be sized to fit within the chamber 118 of the body 110 so that it may freely travel within the body 110 without binding against the sides of the base 128. The base 128 is shown and described as being box-like in shape for illustrative purposes. It is understood, however, that the base 128 may include other configurations that permit linear movement of the base 128 within the device body 110.

A hook 129 may be fixedly secured to an upper region or top side of the base 128. The hook 129 may include an elongated base 130. The opposite distal ends of the base 130 may extend upwardly and curve toward each other to form hook members 132. The hook members 132 are spaced apart and define a gap therebetween. Under static conditions, the carriage assembly 126 is positioned at about the center of the body 110 of the device 100. The hook members 132 project through the slot 122.

The elastic members 124 may include, for example, bungee cords, extension springs, rubber bands, or similar elastic material capable of stretching and returning to its original shape. The respective elastic members 124 may be connected to opposite sides of the carriage assembly base 128 and extend in opposite directions therefrom. The distal end of each elastic member 124 may pass through an opening in a respective end wall 114 and secured to pull knobs or pull rings 134.

Figure 4:
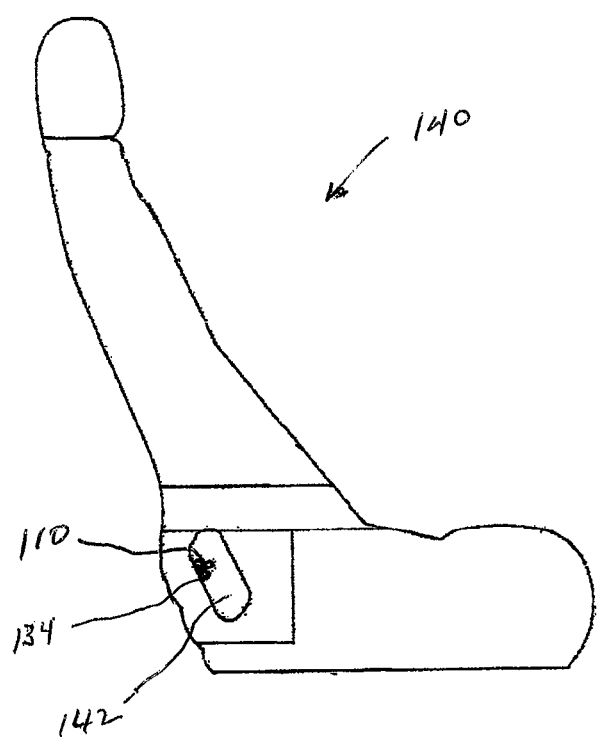
FIG. 4 is a side view of a child's car seat depicting the threading device shown in FIG. 1 installed in the channel of the child's car seat.
Figure 6:
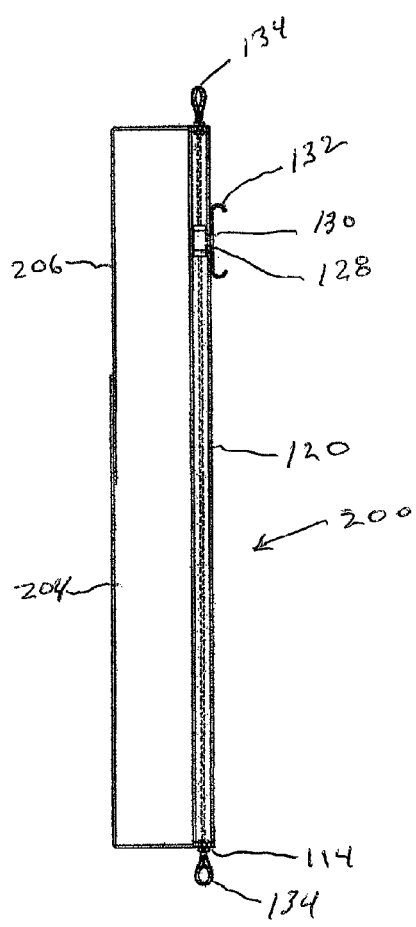
FIG. 6 is a side view of the threading device shown in FIG. 5.
Figure 5:
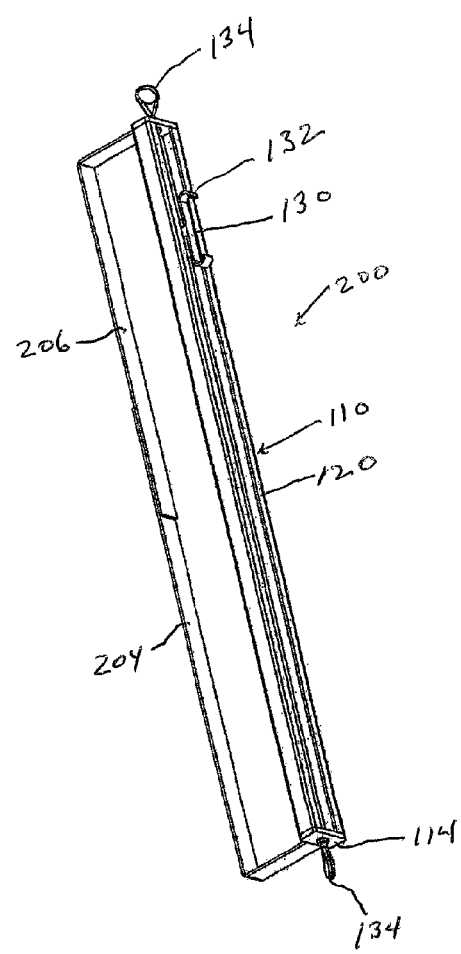
FIG. 5 is a perspective view of another embodiment of a device for threading a seat belt through a channel in a child's car seat.

Referring now to FIG. 4, a typical child's car seat 140 may include a passageway or channel 142 extending through a lower back portion of the car seat 140. It is understood, however, that the size, location and shape of the channel 142 shown in the drawings is merely exemplary and not intended to be limiting. The threading device 100 may be fixedly secured in the channel 142 in a conventional manner. For example, a hook and loop fastener may be adhesively applied to the bottom wall 116 of the device 100 and a corresponding hook and loop fastener adhesively secured in the channel 142. Alternatively, the device 100 may be secured in the channel 142 using screws, bolts, rivets and the like.

The pull rings 134 project slightly outside the opposite sides of the channel 142 of the car seat 140. To fasten the car seat belt and secure the child's car seat to a vehicle seat, a user may pull the near side ring 134 and thereby stretch the elastic members 124 and move the carriage assembly 126 to the near side of the car seat 140. The vehicle seat belt latch may then be attached to a hook member 132 of the carriage assembly 126. Release of the pull ring 134 permits the elastic members 124 to return to their original pre-tension positions and advance the carriage assembly 126 and vehicle seat belt attached thereto to about the center of the channel 142. The user may then pull the ring 134 on the opposite side of the car seat 140 and pull the carriage assembly 126 and the vehicle seat belt attached thereto to the far side of the car seat 140 so that the seat belt latch is positioned proximate the far side open end of the channel 142. The user may then grasp the seat belt latch, disengage it from the hook member 132 and latch it to the car seat buckle.

Figure 7:
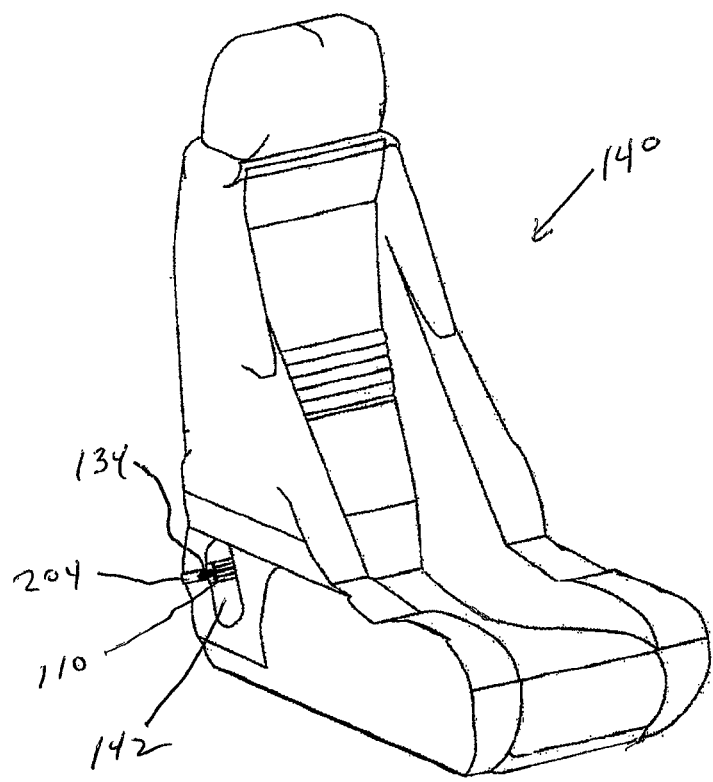
FIG. 7 is a side perspective view of a child's car seat depicting the threading device shown in FIG. 5 installed in the channel of the child's car seat.
Figure 8:
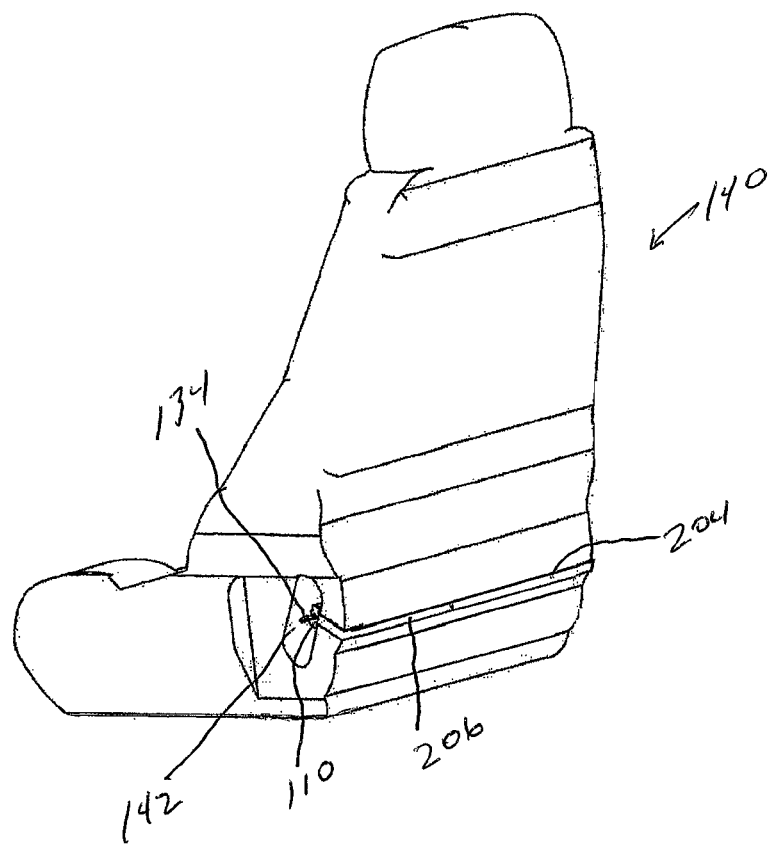
FIG. 8 is a rear perspective view of the child's car seat and threading device shown in FIG. 7.

Referring now to FIGS. 5-8, another embodiment of a device for threading a seat belt through a channel in the back of a child's car seat is generally identified by the reference numeral 200. As suggested by the use of common reference numerals, the device 200 is similar to the device 100 described above with the exception that the device 200 may include a strap 202 for securing the device 200 to a child's care seat. The strap 202 may comprise two strap segments 204 and 206. The strap segments 204 and 206 each have a distal end secured to a respective end wall 114 of the device 200. The opposite distal ends of the strap segments 204 and 206 overlap and may be connected together to secure the device 200 in the car seat channel 142, as shown in FIGS. 7 and 8. A portion of the strap segments 204 and 206, proximate the distal ends thereof, may be provided with fasteners, such as a hook and loop fabric or snaps or similar fasteners, to join the distal ends of the strap segments 204 and 206 and securely hold the device 200 in the channel 142. The device 200 may be easily installed by positioning the body 110 of the device 200 in the car seat channel 142. The strap segments may then be pulled around the back of the car seat 140 and the ends thereof fastened together. A user may then secure the child's car seat to the vehicle seat in the manner described above.

Figure 9:
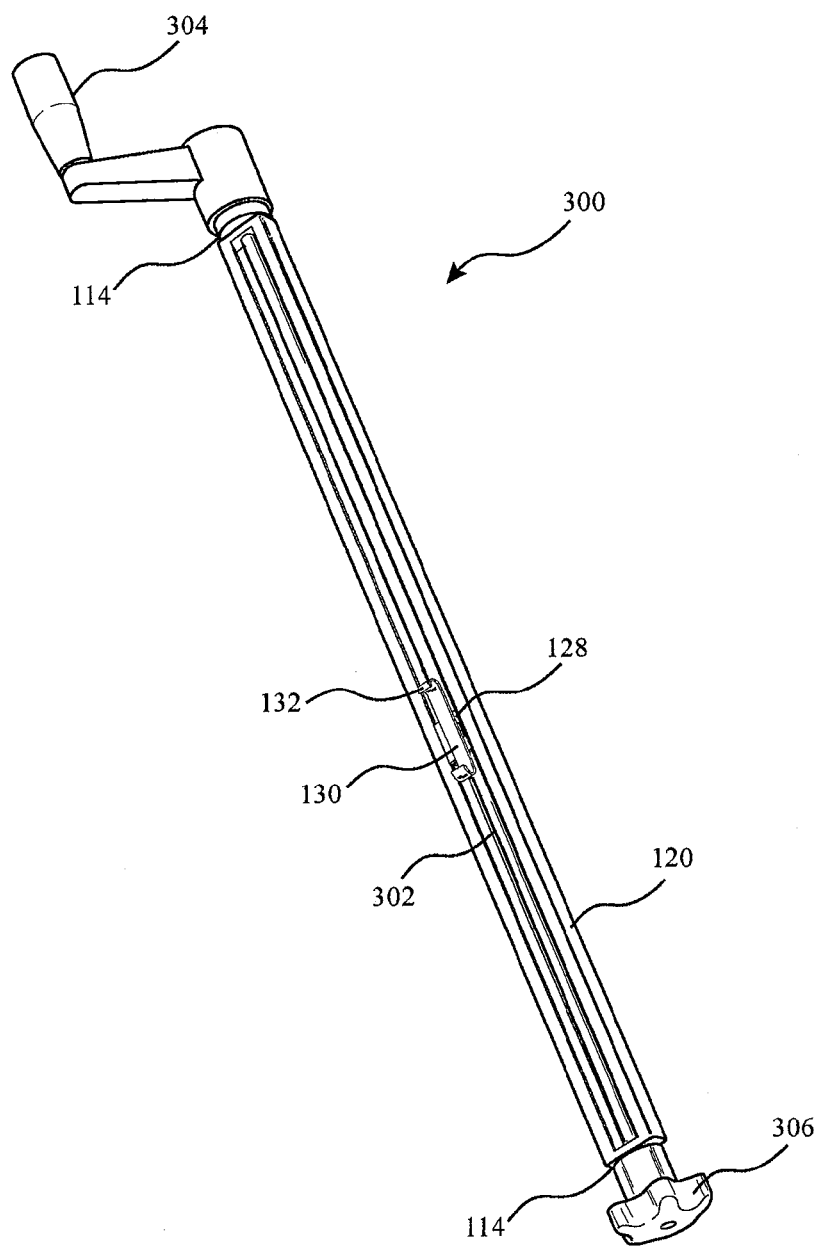
FIG. 9 is a perspective view of another embodiment of a device for threading a seat belt through a channel in a child's car seat.

Referring now to FIG. 9, another embodiment of a device for threading a seat belt through a channel in the back of a child's car seat is generally identified by the reference numeral 300. As suggested by the use of common reference numerals, the device 300 is similar to the device 100 described above with the exception that the device 300 may be provided with a linear motion screw drive 302 instead of elastic members to move the carriage assembly 126 between the ends 114 of the device body 110. The screw drive 302 may be supported at the distal ends thereof by the ends walls 114. A crank handle 304 may be removably connected to an end of the screw drive 302 and a knob or end cap 306 threaded on the opposite end of the screw drive 302. The carriage assembly 126 may be coupled the traveling screw supports of the drive 302. Rotation of the crank handle 304 operates the screw drive 302 and moves the carriage assembly 126 to one end of the device body 110 in a known manner. Rotation of the crank handle 304 in a opposite direction moves the carriage assembly 126 to the opposite end of the device body 110. Alternatively, the device 300 may be include a knob 306 threaded on both distal ends of the screw drive 302 and a user may turn the knobs 306 to actuate the linear motion screw drive 302. A user may secure the child's car seat to the vehicle seat in a similar manner as described above with reference to FIG. 1.

While preferred embodiments of the invention have been shown and described, other and further embodiments of the invention may be devised without departing from the basic scope thereof, and the scope thereof is determined by the claims which follow.

The invention claimed is:

1. A device for threading a vehicle seat belt through a passageway in a child's car seat, comprising:
   a) an elongated body secured within the passageway of the car seat, said elongated body defining a longitudinal interior chamber, said body including end walls at opposite distal ends of said body, wherein each said end walls includes an opening providing access to said chamber;
   b) a carriage assembly movably supported within said interior chamber, and wherein said carriage assembly is detachably coupled to the vehicle seat belt; and
   c) a drive mechanism operatively connected to said carriage assembly, wherein actuation of said drive mechanism moves said carriage assembly in a longitudinal direction within said elongated body.

2. The device of claim 1 wherein said carriage assembly includes a base and a hook member mounted on said base.

3. The device of claim 1 wherein said drive mechanism includes elastic members connected to opposite sides of said carriage assembly, and wherein a distal end of each said elastic members extends through said opening of a respective said end walls and is fixedly secured to a pull knob.

4. The device of claim 1 wherein said drive mechanism includes elastic members connected to opposite sides of said carriage assembly, and wherein a distal end of each said elastic members extends through said opening of a respective said end walls and is fixedly secured to a pull ring.

5. The device of claim 1 wherein said drive mechanism comprises a linear motion screw drive concentrically supported by said body, and wherein the carriage assembly is coupled to said screw drive.

6. The device of claim 5 including a crank handle removably attached to an end of said screw drive configured for grasping by a user to rotate said screw drive.

7. The device of claim 5 including a knob threaded on each end of said screw drive configured for grasping by a user to rotate said screw drive.

8. The device of claim 1 including mounting straps connected to opposite ends of said elongated body, wherein said mounting straps secure the device in the passageway of the car seat.

9. The device of claim 1 including a longitudinal slot in a top wall of said elongated body.

10. The device of claim 9 wherein said carriage assembly includes a hook member extending through said longitudinal slot.

* * * * *